United States Patent [19]

Jordening

[11] 4,437,599

[45] Mar. 20, 1984

[54] BICYCLE/WHEELCHAIR CARRIER

[76] Inventor: Harold G. Jordening, 1541 E. LaPalma, Anaheim, Calif. 92804

[21] Appl. No.: 351,328

[22] Filed: Feb. 22, 1982

[51] Int. Cl.$^3$ ............................ B60R 9/00; B62H 3/00
[52] U.S. Cl. ............................ 224/319; 224/42.03 B; 224/42.45 R; 224/320; 280/289 WC
[58] Field of Search ........ 224/324, 322, 320, 42.45 R, 224/319, 315, 42.03 B, 42.03 A, 42.03 R, 42.46 R, 309, 314; 280/289 WC, 242 WC; 414/3, 462; 248/503; 211/17, 18, 22

[56] References Cited

U.S. PATENT DOCUMENTS

| | | | |
|---|---|---|---|
| 3,924,751 | 12/1975 | Ballenger | 211/17 |
| 4,213,729 | 7/1980 | Cowles et al. | 224/42.03 B X |
| 4,296,879 | 10/1981 | Jordening | 224/42.45 R |
| 4,297,069 | 10/1981 | Worthington | 224/42.03 R X |
| 4,325,576 | 4/1982 | Guthrie | 280/289 WC X |

Primary Examiner—Allan N. Shoap
Assistant Examiner—Robert Petrik
Attorney, Agent, or Firm—Frank C. Price

[57] ABSTRACT

The frame of a bicycle carrier, which is used on an automobile, is adapted to allow the carrying of a collapsed wheelchair. The wheelchair is supported by a bar under the hand grips and by a cable which is looped through the arm rests.

In order to prevent having the hand grips jump off their support, two closely positioned parallel bars are used.

One bar is a weight supporting bar, the other is a motion-limiting bar. The latter precludes the hand grips from jumping off the support bar.

2 Claims, 2 Drawing Figures

BICYCLE/WHEELCHAIR CARRIER

BACKGROUND

1. Field of the Invention

This invention relates to the convenient transporting of wheelchairs by automobile. This invention is especially useful where the automobile lacks sufficient trunk space or where the hoisting of the wheelchair into and out of the trunk or station wagon deck is too arduous a task for the person involved. The invention also relates to bicycle carriers for automobiles since the invention adapts an existing bicycle carrier to facilitate the carrying of a wheelchair.

2. Description of the Prior Art

A wheelchair can be carried by an existing bicycle carrier simply by fashioning a number of loops of rope or the like around the two objects while the wheelchair is held in place against the bicycle carrier. The problems associated with this are three-fold: (1) This normally should require two persons or one very adroit and strong person to hold the wheelchair in place while it is tied on, (2) attachment may not always be secure enough to maintain the wheelchair in place or to hold against vibration and damage; and (3) the time consumed may be excessive for some people. Jordening, U.S. Pat. No. 4,296,879 has disclosed an extensible support member which functions to lie across the horizontal support pieces of a bicycle carrier. The one end of the extensible support member is configured to hold and support the handle bars of a bicycle. In the present invention that one end is configured to hold the handle grips of a wheelchair.

SUMMARY

In the present invention the key item is the use of two horizontal and parallel members which allow easy positioning of a wheelchair on a bicycle carrier. These two members suspend the one end of the wheelchair by its hand grips and at the same time prevent the hand grips from moving off their suspension when there is shaking caused by the automobile's travel over bumps in the road. The front end of the wheelchair is suspended by a hook or loop of cable running through and under the arm rests.

The invention takes two forms. One is a main extensible member which readily is adapted to the distance between the bicycle hanging bars. The extensible member has the two-member support formed at one end. The wheelchair carrier is hooked over the hand grips. A loop or cable is formed through and under the arm rests. Then the extensible member, with the wheelchair attached, is set onto the bicycle hanging bars. A "D" shaped ring, fastened to the main member on its underside serves to hold a fastening cable and it becomes an impediment to the extensible members' moving off the bicycle carrier bar in one direction.

In the other form, the bicycle carrier itself is modified to allow the convient mounting of a wheelchair. The modification includes four members, one a horizontal strengthening bar connected between the two bicycle carrier hangers at their midpoint. A "D" ring is attached to one of the hanger bars to accomadate a cable which supports the arm rest end of the folded wheelchair. Beneath the other bicycle carrier hanger is attached a "U" shaped piece which is the main hanger support for the wheelchair hand grips. Two pieces extending from the "U" have openings at their ends to allow a bar to be run through, thus forming a block against movement of the hand grips off the main hanger.

DESCRIPTION OF THE EMBODIMENTS

Figure 1:
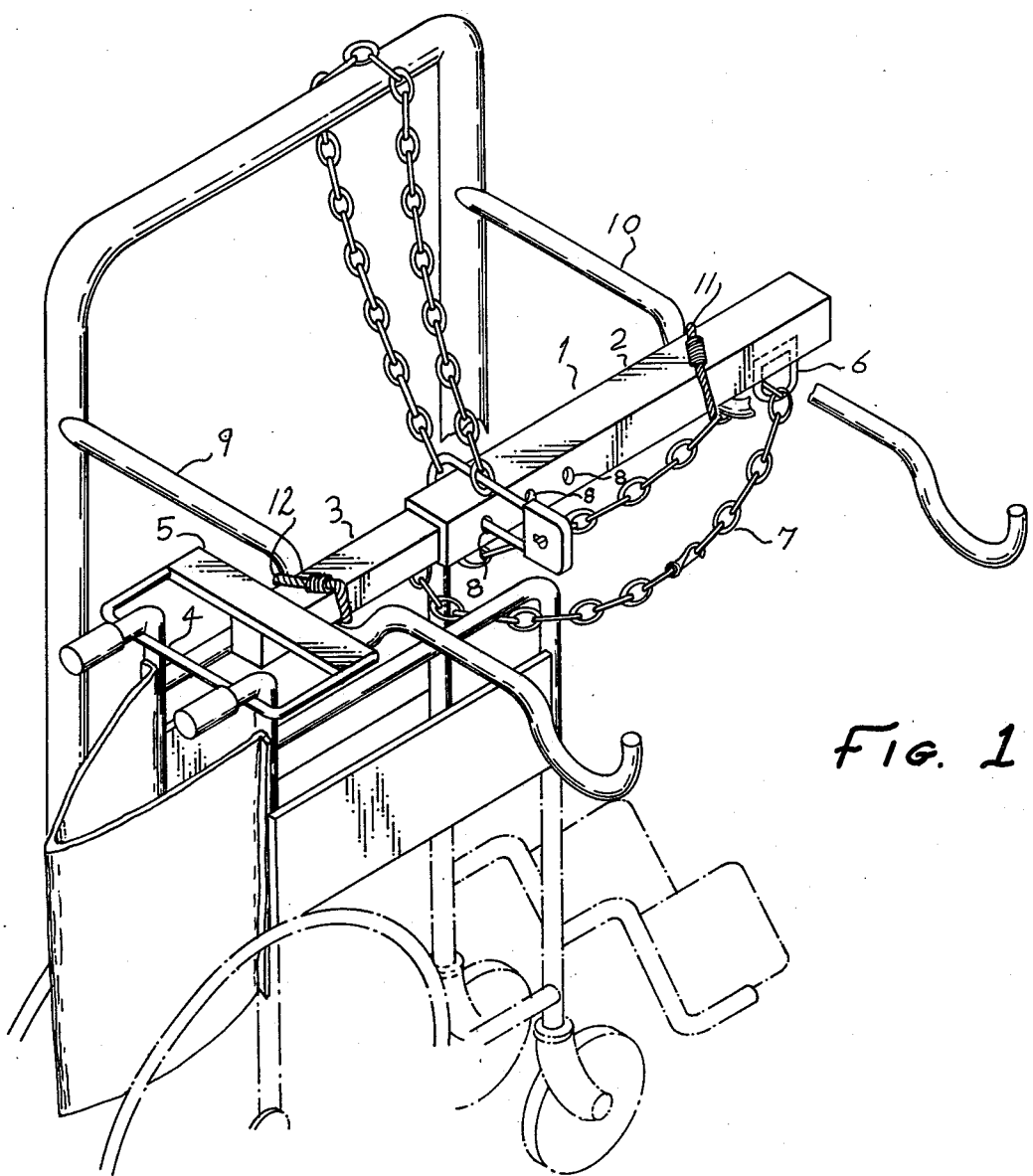
FIG. 1 is an isometric view of the extensible unit with wheelchair mounted on a bicycle carrier.

Referring to the drawings, there is illustrated in FIG. 1 the wheelchair carrier support 1 positioned on the projecting pieces 9 and 10 of a bicycle carrier. The pieces 2 and 3 can be telescoped to fit over pieces 9 and 10 of a given bicycle carrier. Straps 11 and 12 hold telescoping pieces 2 and 3 to projecting pieces 9 and 10. Holes 8 through the telescoping pieces 2 and 3 can be used with any pin or bolt or lock for locking the pieces 2 and 3 in position and to the major frame of the bicycle carrier. The "D" ring 6 inhibits the pieces 2 and 3 from traveling to the left, as shown in the figure, off the support piece 10. A cable 7 is looped through the "D" ring 6 and through the hand rails of the wheelchair to suspend that end of the collapsed wheelchair. The piece 4 supports the collapsed wheelchair by its hand grips while the piece5 prevents the wheelchair from moving to the right far enough during rough transport for the hand grips to fall from their support 4.

Figure 2:
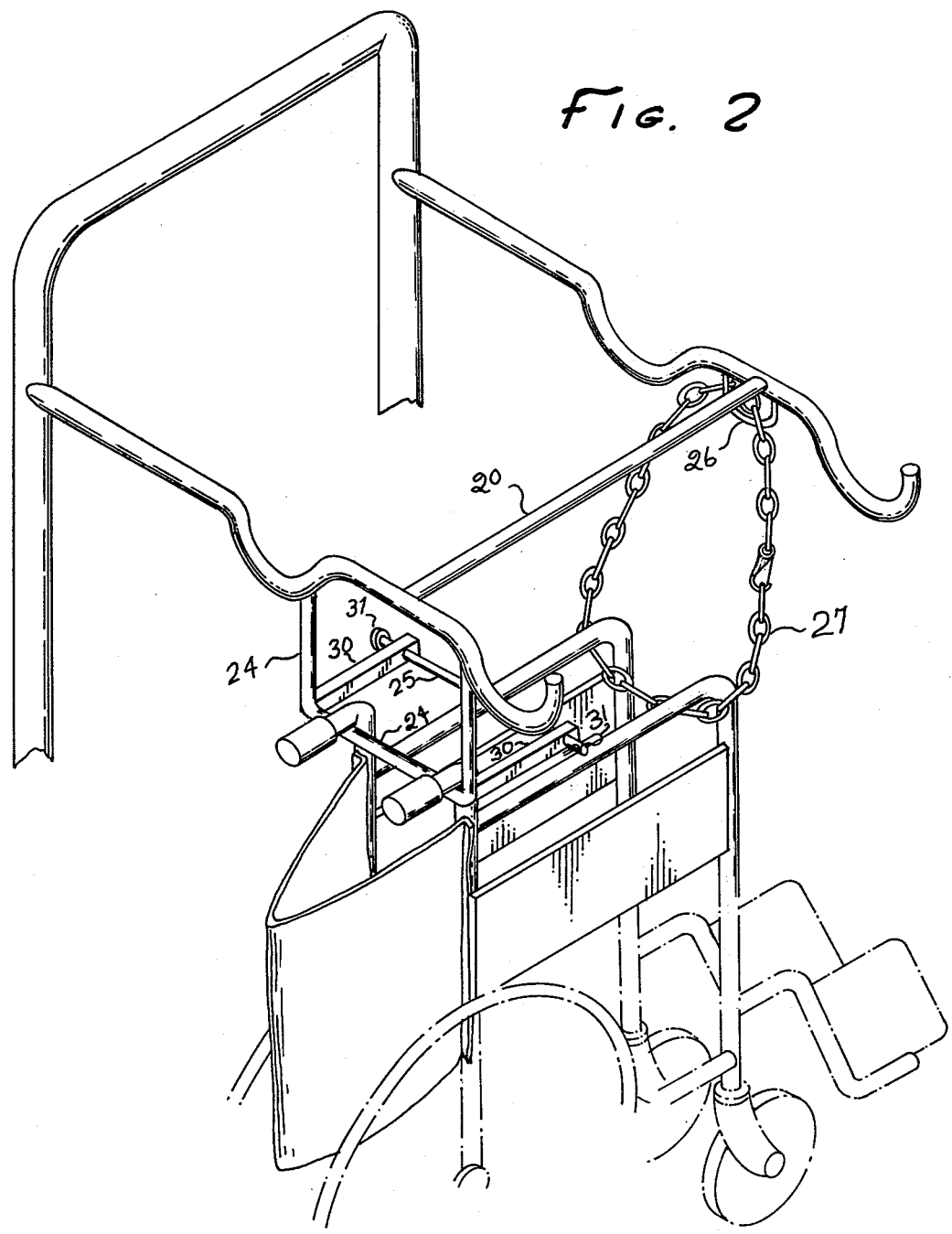
FIG. 2 is an isometric view of the modified bicycle carrier with a wheelchair attached.

FIG. 2 illustrates the invention as it applies to the modification of an existing bicycle carrier. The existing horizontal pieces of the bicycle carrier 9 and 10 are modified by add-on pieces. The add-on pieces of the invention are the horizontal stiffening piece 20, the "D" ring 26 which holds the support cable 27 to the wheelchair arm rests, the "U" shaped piece 24 which supports the wheelchair hand grips, the horizontal pieces 30 which contain the pin 25 which prevents the wheelchair hand grips from moving off their support 24. The pin 25 is configured at its ends to hold it in place, one end having a head 31 and the other end a clip or other device such as threads and a nut.

I claim:

1. A device for adapting a vehicle-mountable bicycle carrier with its projecting horizontal support pieces on which there rests a bicycle cross bar, the adaptation permitting the carrying of a collapsed wheelchair having two rearwardly projecting horizontal hand grips wherein the adaptation includes an extensible member which lies horizontally on the projecting bicycle support pieces, the extensible member having larger and smaller telescoping pieces, the improvements comprising:

a cross-piece attached to the end of the smaller telescoping piece, a generally U-shaped member joined to the cross-piece at each end of each leg of said U-shaped member with the base of said U-shaped member with the base of said U-shaped member spaced from said cross-piece, said base serving as a support for the handgrips of a wheelchair said cross-piece functioning to prevent the hand grips from moving off said base transport of the wheelchair, the larger piece of the extensible member having a ring attached to its bottom surface, the ring functioning to contain a loop of cable which supports the front end of the collapsed wheelchair, the ring further functioning as a projection to inhibit the horizontal extensible member from moving sideways off the bicycle support pieces.

2. On a bicycle carrier frame having two projecting pieces spaced apart which normally function to support the bicycle, attachments to the projecting pieces to allow the carrying of a collapsed wheelchair comprising:
- a horizontal piece perpendicular to and connecting the projecting pieces, the horizontal piece functioning as a stiffener to the two projecting pieces of the bicycle carrier,
- two "U" shaped configurations, a first "U" shaped hanger configuration, lying substantially in a vertical plane, being attached to the underside of one of the projecting pieces of the bicycle carrier and lying in said vertical plane which includes the projecting piece, the attachment points being the tops of the legs of the "U", the bottom of the first "U" shaped piece serving as a hanger support for the wheelchair hand grips; at each of the two corners of the first "U" there being attached a horizontal bar extending generally parallel to said stiffener toward the other projecting piece of the bicycle carrier and together forming the legs of the second "U" shaped piece, each bar formed at its end to provide for one pin to be threaded through the ends of each, a means for locking the pin in place, the pin being the base of said second "U", the pin functioning to prevent the wheelchair hand grips from jumping off the bottom of the first "U".

* * * * *